United States Patent
Satish

(10) Patent No.: US 8,335,661 B1
(45) Date of Patent: Dec. 18, 2012

(54) SCORING APPLICATIONS FOR GREEN COMPUTING SCENARIOS

(75) Inventor: Sourabh Satish, Fremont, CA (US)

(73) Assignee: Symantec Operating Corporation, Mountain View, CA (US)

( * ) Notice: Subject to any disclaimer, the term of this patent is extended or adjusted under 35 U.S.C. 154(b) by 693 days.

(21) Appl. No.: 12/130,482

(22) Filed: May 30, 2008

(51) Int. Cl.
*G06F 11/30* (2006.01)

(52) U.S. Cl. ........ 702/186; 702/115; 713/300; 713/323; 700/291; 323/282; 703/22; 703/23; 703/24; 714/29; 714/47.22; 717/174

(58) Field of Classification Search .................. 702/186, 702/115; 713/300, 323; 700/291, 296; 323/282; 703/22, 23, 24; 714/47.2; 717/174
See application file for complete search history.

(56) References Cited

U.S. PATENT DOCUMENTS

| | | | | |
|---|---|---|---|---|
| 5,763,960 A * | 6/1998 | Ceccherelli et al. | ............ | 307/41 |
| 5,811,962 A * | 9/1998 | Ceccherelli et al. | .......... | 323/282 |
| 7,451,017 B2 * | 11/2008 | McNally | ........................ | 700/291 |
| 7,832,820 B2 * | 11/2010 | Sarmast | .......................... | 347/14 |
| 2003/0063723 A1 * | 4/2003 | Booth et al. | ............. | 379/106.03 |
| 2004/0078185 A1 * | 4/2004 | Briggs et al. | ..................... | 703/24 |
| 2004/0268341 A1 * | 12/2004 | Kenworthy | .................... | 717/174 |
| 2006/0167591 A1 * | 7/2006 | McNally | ........................ | 700/291 |
| 2007/0244604 A1 * | 10/2007 | McNally | ........................ | 700/291 |
| 2008/0111527 A1 * | 5/2008 | Sarmast | ......................... | 323/282 |
| 2009/0240381 A1 * | 9/2009 | Lane | ................ | 700/296 |
| 2009/0276649 A1 * | 11/2009 | Hamilton et al. | ............. | 713/320 |
| 2009/0282327 A1 * | 11/2009 | Hamilton et al. | ............. | 715/231 |

\* cited by examiner

*Primary Examiner* — Carol Tsai

(74) *Attorney, Agent, or Firm* — Campbell Stephenson LLP

(57) ABSTRACT

Various methods and systems for scoring applications are disclosed. One method involves generating a baseline measuring a parameter of a computer system. The parameter is related, directly or indirectly, to the energy consumption of the computer system. The method next involves installing and running an application on the computer system. The previously measured parameter is measured with the application running. Next, a score is calculated for the application based on the two measurements. This score indicates how green the application is.

17 Claims, 6 Drawing Sheets

SCORING APPLICATIONS FOR GREEN COMPUTING SCENARIOS

BACKGROUND OF THE INVENTION

There is a growing movement directed toward finding more energy efficient ways to operate computer systems. This is known generally as green computing. As used herein, the term computer system includes any collection of hardware and software that can be used to processes information. Examples of hardware which may be included in a computer system are one or more servers, personal computers (PCs), personal digital assistants (PDAs), telephones, storage devices (e.g., disk arrays), networking devices (e.g., switches and routers), input/output (I/O) devices (e.g., keyboards and monitors), and other devices, such as power supplies and cooling systems. Examples of software that may be included in a computer system are system software (e.g., file systems, backup systems, and operating systems (OSs)), applications (e.g., word processors), as well as utilities, drivers, and other types of software. There are many techniques available to reduce the amount of energy consumed by a computer system. Most current approaches focus on hardware improvements. Several examples of efforts to reduce energy consumption through hardware optimization are: building hardware which is more efficient; consolidating multiple systems into a single system; and powering down systems when they are idle. There are several groups and initiatives directed toward evaluating computer hardware in terms of energy consumption.

A computer system's energy usage depends on the software application (hereinafter "application") being run on the system. An application, as used herein, includes any type of computer program which can be used to process information in a meaningful way, including but not limited to, system software (e.g., backup systems, operating systems, file managers), application software (e.g., word processors, spreadsheet, media players), and other types of software (e.g., utilities, drivers). An application is not limited to running on one device, but may be distributed across multiple devices. Some applications require a computer system to consume more energy than other applications. Currently there is no way of knowing in advance how a given application will affect a computer system's energy consumption. For someone managing large numbers of computer systems, this could be a serious problem, as deciding which applications to use can have dramatic consequences in terms of energy consumption.

SUMMARY OF THE INVENTION

Disclosed is an apparatus and method for rating an application in terms of energy consumed when the application is running on a computer system. In one embodiment, a method involves measuring, prior to the installation of an application on a computer system or prior to running an installed application, some parameter of the computer system. The measured parameter is one that is related, directly or indirectly, to the computer system's energy consumption. The method then involves running the application on the computer system. While the application is running, another measurement is made of the previously measured parameter. The difference between the two measurements is then used to calculate a score for the application.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
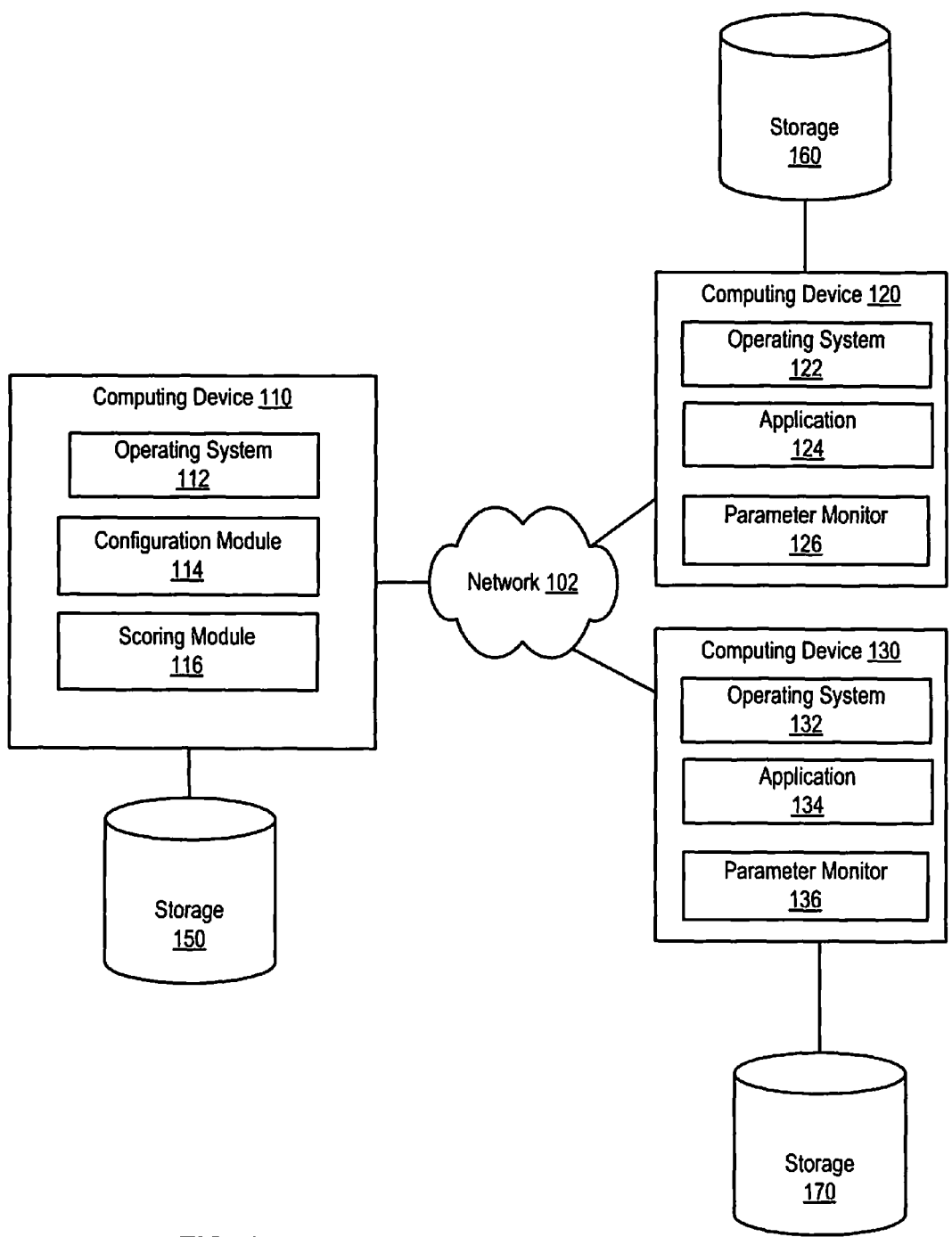
FIG. 1 is a block diagram illustrating relevant components of a system that supports scoring an application, according to one embodiment.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

A computing system with only factory installed software, such as an operating system (OS), is referred to as a bare hardware system. When a bare hardware system is first turned on, it consumes power. Different amounts of power will be consumed when running different operating systems (e.g., Windows, Linux), even when installed on identical hardware. This is due, in part, to how effectively the OS manages system resources.

As post factory applications are installed onto a bare hardware system, the power consumption patterns of the system change. Though a newly installed application may increase the overall power consumption of the system only marginally, on a large scale (e.g., large numbers of computer systems in a data center) this can translate into significant energy consumption costs.

In one embodiment, a scoring system analyzes computer systems that are running applications for their energy usage patterns. Applications are scored for how "green" they are based on the analysis. The scoring system can measure how much an application requires the use of various system resources (e.g., microprocessors, internal and/or external disk drives, etc). Depending on the particular resource and the energy used, or carbon cost, of that resource, an energy cost associated with the resource can be generated.

In some embodiments, various metrics (e.g., hard page faults, I/O Splits) are scored by their energy, or carbon, cost. A metric is some characteristic of a computer system that can be quantified. Metrics may be direct or indirect. A direct metric is one that directly relates to some measurable physical characteristic of the computer system. Parameters are examples of direct metrics. Example parameters include disk read/write bytes/second, CPU interrupts, disk interrupts, and CPU temperature, to name a few. A parameter is a physical characteristic, the value of which can be determined by measurement.

Indirect metrics are metrics which are obtained through some translation of a parameter. For example, I/O splits are indirect metrics. While the number of I/O splits may be quantified, the number of I/O splits cannot be obtained by measuring a parameter. Instead, disk interrupts are measured and the measured value is then translated into I/O splits. Consider the example of providing four read instructions to two applications, a first application and a second application. Disk interrupts can be measured while each application is processing the four read instructions. If a given disk requires two interrupts to access the disk, the minimum number of interrupts that will be measured while an application processes the four reads is eight. However, if ten disk interrupts are measured while the first application processes the four reads and sixteen disk interrupts are measured while the second application processes the four reads, it can be seen that the first application split one of the reads into two. Thus there were five disk accesses instead of four. It can be seen that the second application split each of the four reads into two, resulting in 8 disk accesses, or 16 interrupts. This is known as an I/O split. An I/O split refers to when an OS divides I/O requests to a disk into multiple requests. A split I/O request might occur if an application requests data in a size that is too large to fit into a single I/O request or if the requested data is fragmented on a storage disk. Factors that influence the size of an I/O request can include application design, the file system, or drivers. The measured disk interrupts are parameters of the computer system, also known as direct metrics. The direct metric (disk interrupts) must be translated to obtain the indirect metric of I/O splits. Thus, metrics indicate computer system resource usage. Other metrics may indicate that an application leads to relatively fast degradation of system resources, compared to other applications. For example an application that causes disk fragmentation to occur at a much faster rate will cause the system to have a higher rate of I/O splits resulting in higher rate of disk interrupts. Thus disk fragmentation is an indirect metric.

In some embodiments, applications are analyzed in relation to various selected metrics to determine the carbon impact (energy consumption) that results from running the applications over a period of time. Once a selected metric has been measured for a certain period of time an application can be scored in terms of how green the application is. Eventually, poorly designed applications, which utilize resources in suboptimal fashion, lead to higher energy consumption. Such applications are scored as not as green as applications which cause more energy to be consumed.

For example, applications may be scored based on the direct metric CPU interrupts. A user can measure CPU interrupts on a bare system over a period of time to come up with a baseline measurement. Then, the same measurement can be made while running a first application and while running a second application. If the baseline was 100 interrupts over a given period of time, the measurement for the first application was 200 interrupts over the same length of time, and 300 interrupts for the second application, a score can be calculated for the first and second applications by comparing the values measured while the applications were running with the baseline. It can be seen that the first application caused a 100% increase in interrupts and the second application caused a 200% increase. Thus the score for the first application on the metric CPU interrupts can be presented as 100% and the score for the second application can be presented as 200%. The scores can be presented in various other formats. For example, if it is known that each CPU interrupt results in 2 microwatts of energy consumption, the score for the first application can be given as 200 microwatts and the score for the second can be given as 400 microwatts. In another embodiment, a point system is established with maximum points assigned to those applications which cause no increase in energy consumption (or no increase in the value of a given metric) and points subtracted in proportion to the amount of increase in energy consumption. In the last example, say 0.1 points per microwatt is the assigned scale, with baseline being 100 points. The first application would be scored 90 and the second application would be scored 80.

An application's score may be calculated independently of the nature of the application. For example an application that is highly disk I/O bound (i.e., requires a high rate of disk I/O operations) may be less green than an application which does not require frequent disk I/O operations. Higher energy consumption is inherent in the nature of the application. In other words, simply by the nature of the application, running the application causes greater energy consumption then running other, less disk I/O bound applications. Thus, one might conclude that disk I/O operations is not a useful metric in scoring applications since certain applications will have a lower green score than others simply due to the type of application. However, such a metric is useful when comparing applications which have the same (or similar) functions. For example, disk I/O operations may be useful when comparing applications having the same function, but from different vendors.

Measuring various metrics for their contribution to energy consumption can also be conducted during the application development process. Doing so can lead to more efficient applications. If an application development team has access to the application scoring system during development, the team can comparatively evaluate various design choices and select the most green choice.

FIG. 1 is a block diagram illustrating relevant components of a system that supports application scoring, according to one embodiment. In FIG. 1, computing device 110 is coupled to storage 150. Computing device 110 has an operating system 112. Computing device 110 also implements configuration module 114 and scoring module 116, both of which may take form in instructions executing on a processor of computing device 110. Computing device 110 is coupled to computing device 120 and computing device 130 via network 102. Network 102 can include a WAN (Wide Area Network), such as the Internet, one or more LANs (Local Area Networks), and/or one or more SANs (Storage Area Networks). Computing device 120 has an operating system 122 and application 124 and implements monitor 126. Computing device 130 has an operating system 132 and application 134 and implements parameter monitor 136. Computing device 120 and computing device 130 may have different hardware and/or software configurations. For example, computing device 120 may have single processor while computing device 130 may have multiple processors or computing device 120 may have a Windows operating system while computing device 130 may have a Linux operating system. Computing device 120 and computing device 130 are coupled to storage 160 and storage 170, respectively. Computing device 110, computing device 120, and computing device 130 can each be a personal computer, laptop computer, multiprocessor computer server, or the like. While FIG. 1 shows three computing devices, it should be understood that that is merely exemplary and the system may include more or less. In the example when the system is implemented in a data center, there will typically be thousands of computing devices.

Storage device 150, storage device 160, and storage device 170 each provides persistent data storage. Each storage device can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Each storage device can also be a virtual or logical storage device that is implemented on such physical storage devices and/or storage systems. For example, each storage device can be a logical volume that is implemented on a RAID storage system. Storage device 150, storage device 160, and storage device 170 can include one or more storage devices. Storage device 150, storage device 160, and storage device 170 can also include one or more types of storage media, including optical media (e.g., CDs and DVDs) and magnetic media (e.g., hard disks or magnetic tape).

The system of FIG. 1 is controlled using computing device 110, which implements configuration module 114, as noted. Using configuration module 114, a user can install and uninstall applications on computing devices in the system, for example application 124, on computing device 120. In one example, application 124 is a backup application such as BackupExec™ available from Symantec Corporation of Cupertino, Calif.

Based on user input, configuration module 114 can select which computing device to install an application on from among a plurality of computing devices, for example, computing device 120 or computing device 130. Selection may be based on hardware characteristics of the computing devices. For instance, it may be desirable to compare an application's performance on various hardware systems. In this case, a user may select computing devices from different manufacturers, for example. Selection of which computing device to install an application on may also be performed based on the various operating systems which may be installed. For instance, it may be desirable to compare the performance of an application on a Windows machine versus on a Linux machine. In the example where the scoring system is used in application development, portions of an application may be loaded on a computing device in order to test the incomplete application.

Configuration module 114 is also used to specify the operations the application should run and the data the application should use. For instance, configuration module 114 can command the application to backup data. The amount of data to backup, the source and destination of the data, and contents of the data may also be specified via configuration module 114. For example, configuration module 114 could be used to write 100 gigabytes of a specified pattern (e.g., 0xF0F0) to a specified location in storage 150. Configuration module can then instruct an application (e.g. application 124) to backup the data, for example, to a specified location in storage 160.

The configuration module can also be used to control the duration an application is to perform an operation when energy consumption related parameters are measured. For example, a user can control an application, such as application 124, to write 1 s to a given location, for example in storage 160, for 2 hours.

Configuration module 114 is also used to specify one or more metrics to monitor or measure. Computing devices, for example computing devices 120 and 130 can be monitored for a number of different metrics, such as disk interrupts or graphics operations per second. These are simply two examples. Any measurable metric which has an impact on the energy consumption of the computing device and resources used by the computing device, can be specified to be monitored via configuration module 114. Configuration module 114 may translate user specified metrics into physical system parameters to monitor, for example, in the case where a user specifies an indirect metric, such as I/O splits, configuration module 114 is configured to monitor disk interrupts.

Such monitoring is accomplished using a parameter monitor, for example parameter monitor 126. The parameter monitor is configured to measure and record various parameters. The parameter monitor is also configured to communicate the recorded measurements to a scoring module, such as scoring module 116.

Having installed an application on a computing device, set up the test operations the application is to execute, and configured a parameter monitor to monitor the desired parameters, a user configures a scoring module such as scoring module 116, to generate a score for the application. For example, the user can specify the format and units that the score is to be displayed in. The scoring module receives as input measured parameter(s) captured by the parameter monitor, as well as configuration information from, for example, configuration module 114. Scoring module may also receive additional information, such as information on operating characteristics from various hardware manufacturers. Scoring module calculates a score for the application. The score may be based on one or more of the following factors: the environment the application was run in (i.e., the hardware, OS configuration of the computing system the application was scored on), the measured parameter(s) from the parameter monitor, and user preference. Other factors may be considered as well, such as specific needs of a user, energy costs, industry practices, and the like. A user may give greater weight to different metrics in computing a score for different applications. For example, a weighted average may be calculated for an application which scored 95% for CPU interrupts and 80% for I/O splits by multiplying the two scores by assigning each score a weight. For instance, if the score for I/O splits is deemed more critical to than the score for CPU interrupts, an overall score may be calculated for the application by multiplying 80% by 0.8, and averaging that product with 95% multiplied by 0.2, for an overall score of 83%.

Figure 2:
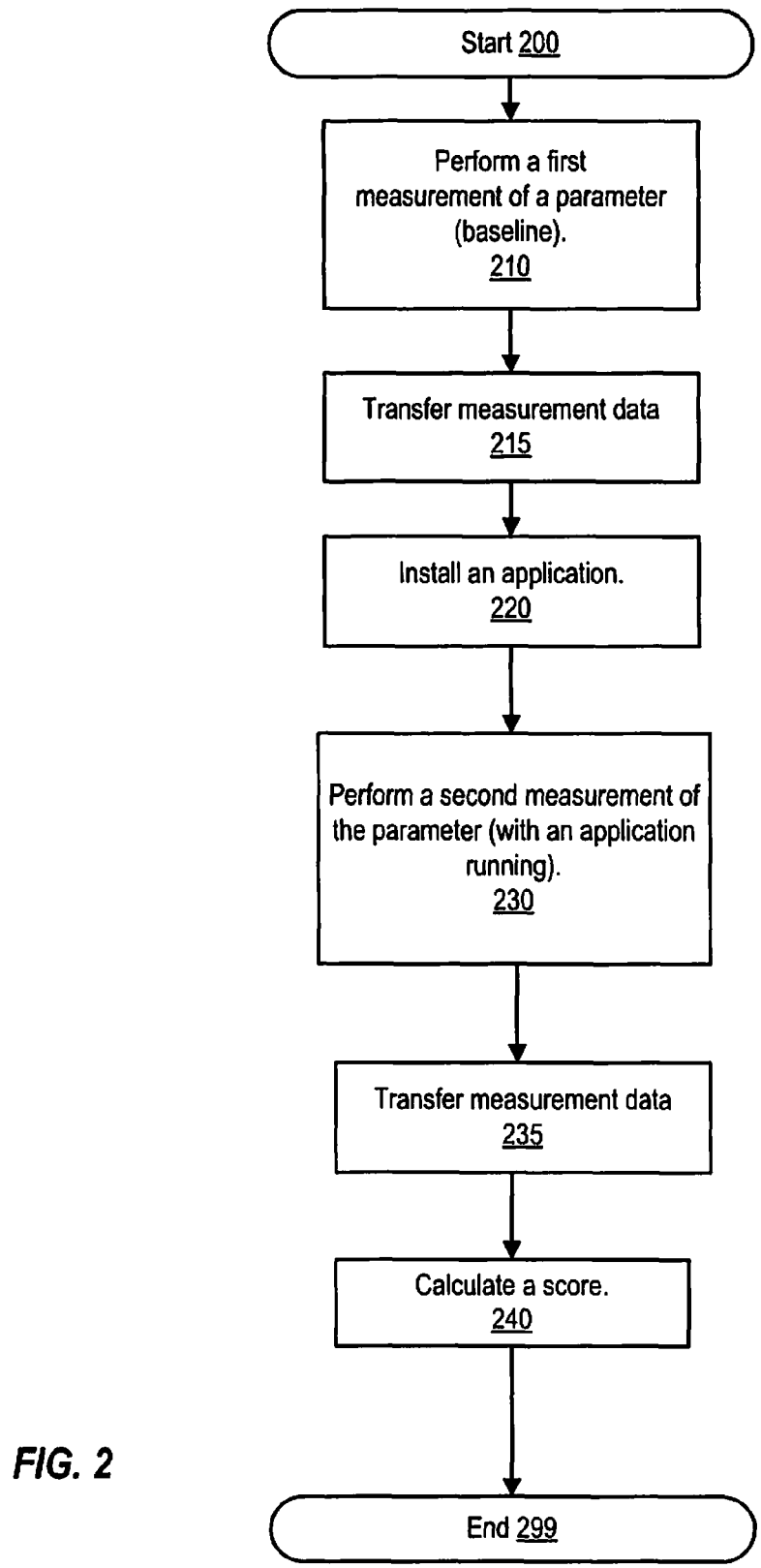
FIG. 2 is a flowchart illustrating relevant aspects of a method of scoring an application, according to one embodiment.

FIG. 2 is a flowchart of a method of scoring an application, according to one embodiment. At operation 210, a first measurement of a parameter (e.g., CPU interrupts) of a computing device, such as computing device 120 of FIG. 1, is performed. This first measurement can be performed by a parameter monitor, such as parameter monitor 126 of FIG. 1. The parameter is specified by a configuration module, such as configuration module 114 of FIG. 1. It should be understood that multiple parameters can be monitored simultaneously, for a given test condition, or operation. The test conditions (e.g., data pattern, duration) are also specified by the configuration module. The measurement may be made on a bare computer system. This first measurement is referred to as a baseline measurement. At operation 215, the parameter monitor transfers the recorded baseline measurement(s) data to a scoring module, for example, scoring module 116 of FIG. 1. For example, CPU interrupts may be measured for a one minute period and then the measured value of CPU interrupts (e.g., 100) may be transferred to the scoring module.

At operation 220, an application, such as application 124 of FIG. 1, is installed on the computer system. The application may be any type of application, or may even be a portion of an application under development. In one example, the application is a backup application.

At operation 230, the same parameter that was measured previously (i.e., CPU interrupts) is measured again. Ideally the test will run for the same period of time (i.e. one minute). For this measurement, the first application is running using the specified test configuration. For example CPU interrupts may be measured for one minute while the backup application writes a specified pattern (e.g., 0x1010) to a backup disk. At operation 235, the parameter monitor transfers the recorded measurement (e.g., number of CPU interrupts) to the scoring module. For example, the parameter monitor may record 235 CPU interrupts in one minute of the backup application writing 0x1010 to a backup disk.

Finally, at operation 240, the scoring module calculates a score for the application. In the above example, an increase of 135% in the number of CPU interrupts was recorded. The measured parameter may not be in energy units but may be directly or indirectly related to energy consumption. In the case where the measured value of the parameter needs to be converted to energy units, the conversion is performed by the scoring module. For example, if the measured value of CPU interrupts is 235, the amount of energy used can be obtained by multiplying the number of CPU interrupts (e.g., 235) by the amount of energy required per interrupt (e.g., 10 microwatts) for a score of 2.35 milliwatts. The amount of energy required per interrupt may be provided by a hardware manufacturer or may be obtained experimentally. This score is known as the application's green score. The score may be based on the comparison of multiple metrics. Each metric may be given different weight. Other variables may be included in the calculation of the score, such as how I/O bound the application is, the availability of energy, or the like.

Figure 3:
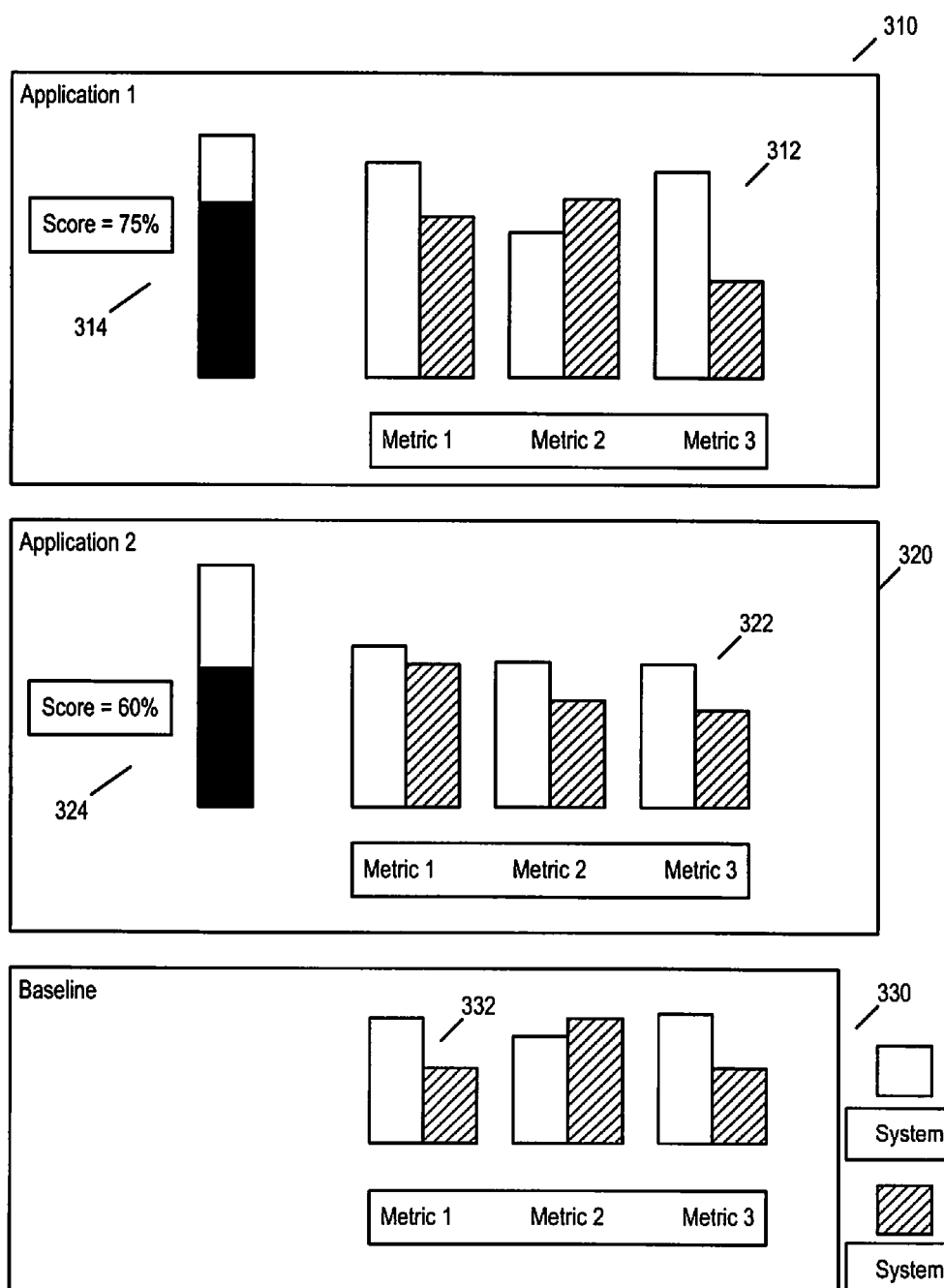
FIG. 3 is a diagram showing an example display of an application's score, according to one embodiment.

FIG. 3 is a diagram showing a display of an application's score. FIG. 3 shows displays 310 and 320 for applications 1 and 2, respectively. Displays 310 and 320 include graphical displays 312 and 322 of measurements of various metrics for applications 1 and 2, respectively. The displayed values may be actual measured values of the metrics or may be scaled or converted from the measured value. Displays 310 and 320 also include an overall score 314 and 324 for applications 1 and 2, respectively. FIG. 3 also shows a display 330 which includes baseline measurements 332 of several metrics. Values 312, 322, and 332 are shown as having been obtained for system 1 and system 2. Displays 310, 320, and 330 are examples of how application score information can be presented. The displays can be represented on a computer screen or printed out, or displayed in any other available medium. FIG. 3 is intended to be exemplary only. The number of metrics and systems may vary, as may the format of data presentation.

Figure 4:
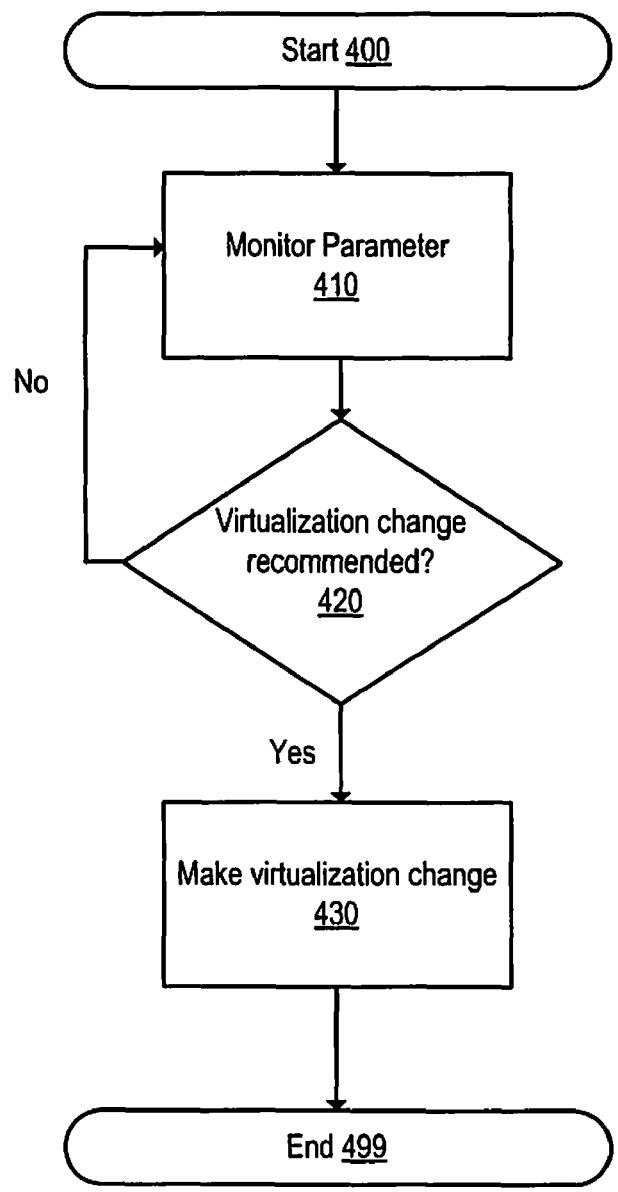
FIG. 4 is a flowchart illustrating relevant aspects of a method of implementing virtualization, according to one embodiment.

FIG. 4 is a flowchart of a method of implementing virtualization, according to one embodiment of the present invention. At operation 410, parameters, such as those discussed in relation to FIG. 3, are monitored by a monitoring module, for example, parameter monitor 126 of FIG. 1. In a virtualization environment, a configuration module, such as configuration module 114 of FIG. 1 resides on a virtualization platform. A virtualization platform is a computing device, such as computing device 110 of FIG. 1, on which virtualization software is installed. An operating system, such as operating system 112 of FIG. 1, is modified to act as the domain 0 (dom0) virtualization supervisor. The dom0 operating system has management privileges over other guest operating systems (domU operating systems), for example operating system 122 of FIG. 1. At operation 420, the monitor module detects that measured metrics of a given system fall outside a given range (as specified using the configuration module). At operation 430, the dom0 operating system orders the domU operating system to suspend operations. At some time in the future, or upon the occurrence of some event, the dom0 operating system may order the domU operating system to resume operations.

Figure 5:
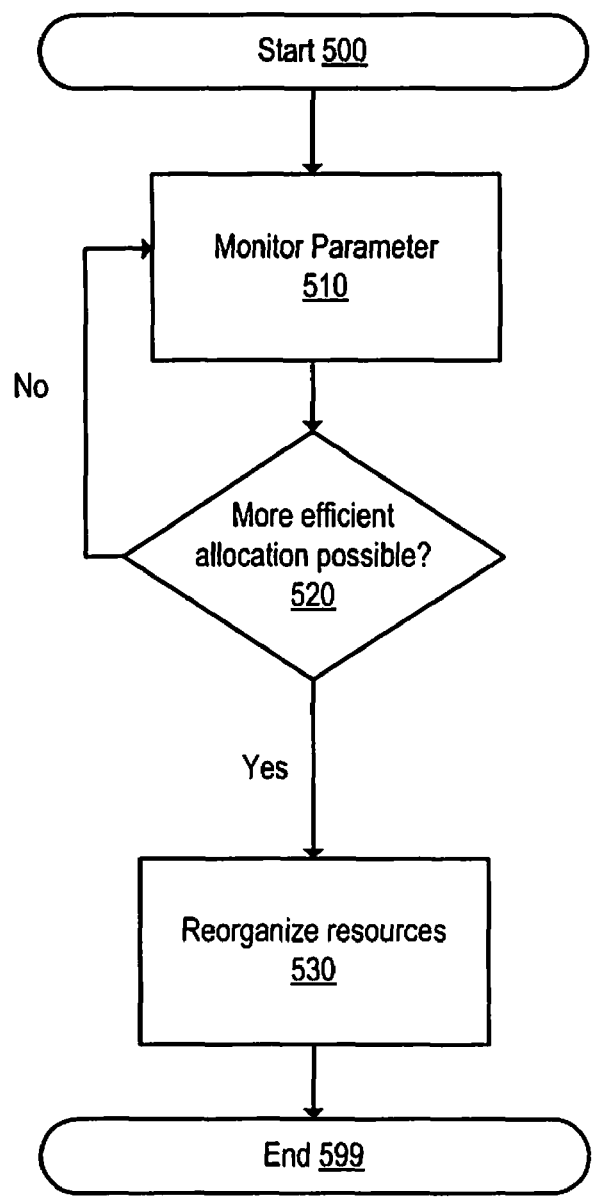
FIG. 5 is a flowchart illustrating relevant aspects of a method of implementing hardware migration, according to one embodiment.

FIG. 5 is a flowchart of a method of implementing hardware migration, according to one embodiment of the present invention. At operation 510, parameters of a computing device, such as those discussed in relation to FIG. 3, are monitored by a monitoring module, for example, parameter monitor 126 of FIG. 1. At operation 520, a configuration module, such as configuration module 114 of FIG. 1, determines whether applications running in the system, for example the scoring system of FIG. 1, should be moved from one computing device to another, for example, from computing device 120 to computing device 130, both of FIG. 1. If the configuration module determines that power consumption of the system can be reduced by moving the applications the configuration module orders the change, at operation 630.

Figure 6:
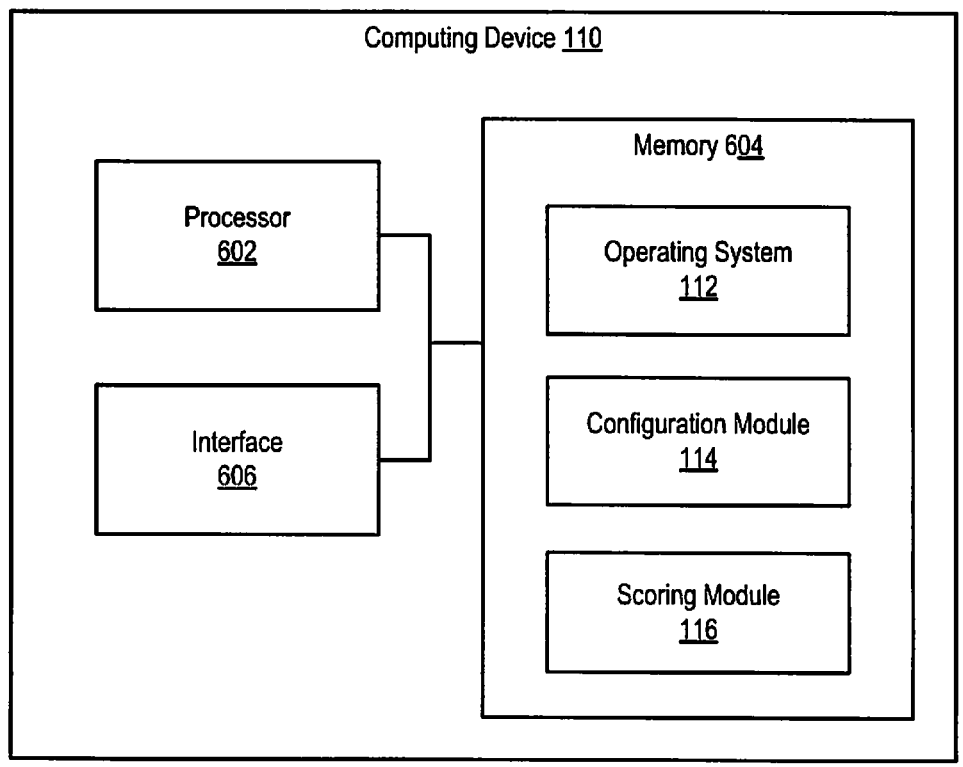
FIG. 6 is a block diagram illustrating relevant components of a computing device that implements scoring an application, according to one embodiment.

FIG. 6 is a block diagram of a computing device that implements a configuration module 114. FIG. 6 illustrates how configuration module 114 can be implemented in software.

FIG. 6 is a block diagram of a computing device 110 that implements a configuration module 114. As illustrated, computing device 110 includes one or more processors 602 (e.g., microprocessors, PLDs (Programmable Logic Devices), or ASICs (Application Specific Integrated Circuits)) configured to execute program instructions stored in memory 604. Memory 604 can include various types of RAM (Random Access Memory), ROM (Read Only Memory), Flash memory, MEMS (Micro Electro-Mechanical Systems) memory, and the like. Computing device 110 also includes one or more interfaces 606. Processor 602, memory 604, and interface 606 are coupled to send and receive data and control signals by a bus or other interconnect.

Interface(s) 606 can include an interface to a storage device. Interface(s) 606 can also include an interface to a network (e.g., network 102 of FIG. 1) for use in communicating with computing devices (e.g., if an application scoring system, as shown in FIG. 1, is being implemented).

The program instructions and data implementing configuration module 114 can be stored on various computer readable media such as memory 604. In some embodiments, such software is stored on a computer readable medium such as a CD (Compact Disc), DVD (Digital Versatile Disc), hard disk, optical disk, tape device, floppy disk, and the like). In order be executed by processor 602, the instructions and data implementing configuration module 114 are loaded into memory 604 from the other computer readable medium. The instructions and/or data can also be transferred to computing device 600 for storage in memory 604 via a network such as the Internet or upon a carrier medium. In some embodiments, a computer readable medium is a carrier medium such as a network and/or a wireless link upon which signals such as electrical, electromagnetic, or digital signals, on which the data and instructions implementing configuration module 114 are encoded, are conveyed.

Although the present invention has been described with respect to specific embodiments thereof, various changes and modifications may be suggested to one skilled in the art. It is intended that such changes and modifications fall within the scope of the appended claims.

What is claimed is:

1. A method comprising:
    generating a first measurement of a parameter of a computer system when an application is not running on the computer system;

generating a second measurement of the parameter while the application is running on the computer;
calculating a difference between the first and second measurements;
calculating a score for the application, based on the difference between the first measurement and the second measurement; and
translating the parameter into a unit of energy consumption, wherein
the parameter is a hardware or software operation of the computer system, and
the parameter comprises at least one of interrupts, I/O operations, or temperature.

2. The method of claim 1, wherein
the first measurement and the second measurement correspond to a first amount of energy consumed by the computer system and a second amount of energy consumed by the computer system, respectively.

3. The method of claim 1 wherein,
the first measurement is generated prior to installing the application on the computer.

4. The method of claim 1 further comprising:
calculating a second score for the application, based on the second measurement.

5. The method of claim 1 further comprising:
selecting the parameter from a plurality of measurable parameters.

6. An apparatus comprising:
a computer system configured to generate a first measurement of a parameter of a computer when an application is not running on the computer system;
the computer system further configured to generate a second measurement of the parameter while the application is running on the computer system;
a first circuit for calculating a difference between the first and second measurements;
a second circuit for calculating a score for the application, based on the difference between the first and second measurements; and
the computer system further configured to translate the parameter into a unit of energy consumption, wherein
the parameter is a hardware or software operation of the computer system, and
the parameter comprises at least one of interrupts, I/O operations, or temperature.

7. The apparatus of claim 6, wherein
the first measurement and the second measurement correspond to a first amount of energy consumed by the computer system and a second amount of energy consumed by the computer sysem, respectively.

8. The apparatus of claim 6 wherein,
the first measurement is generated prior to installing the application on the computer system.

9. The apparatus of claim 6 further comprising:
a second circuit for calculating a second score for the application, based on the second measurement.

10. The apparatus of claim 6, wherein
the computer system is further configured to select the parameter from a plurality of measurable parameters.

11. A non-transitory computer readable storage medium storing program instructions, wherein the program instructions are executable to:
generating a first measurement of a parameter of a computer when an application is not running on the computer;
generating a second measurement of the parameter while the application is running on the computer;
calculating a difference between the first and second measurements;
calculating a score for the application, based on the difference between the first and second measurements; and
translating the parameter into a unit of energy consumption, wherein
the parameter is a hardware or software operation of the computer system, and
the parameter comprises at least one of interrupts, I/O operations, or temperature.

12. The non-transitory computer readable storage medium of claim 11, wherein
the first measurement and the second measurement correspond to a first amount of energy consumed by the computer system and a second amount of energy consumed by the computer sysem system, respectively.

13. The non-transitory computer readable storage medium of claim 11 wherein,
the first measurement is generated prior to installing the application on the computer system.

14. The non-transitory computer readable storage medium of claim 11 further comprising:
calculating a second score for the application, based on the second measurement.

15. The method of claim 1 further comprising:
calculating a second score for a second application; and
comparing the score for the application and the second score for the second application.

16. The method of claim 1 further comprising:
configuring the application, wherein the configuring comprises specifying at least one operation the application should run and data the application should use.

17. The method of claim 1, wherein
the score is based on measurement of a second parameter.

* * * * *